(12) United States Patent
Bachels et al.

(10) Patent No.: US 8,054,411 B2
(45) Date of Patent: Nov. 8, 2011

(54) VOLUME PHOTO-ALIGNED RETARDER

(75) Inventors: Thomas Bachels, Menzingen (CH);
Carsten Benecke, Weil am Rhein (DE);
Hubert Seiberle, Weil am Rhein (DE)

(73) Assignee: Rolic AG, Zug (CH)

( * ) Notice: Subject to any disclaimer, the term of this patent is extended or adjusted under 35 U.S.C. 154(b) by 289 days.

(21) Appl. No.: 12/440,123

(22) PCT Filed: Sep. 7, 2007

(86) PCT No.: PCT/CH2007/000441
§ 371 (c)(1),
(2), (4) Date: Mar. 5, 2009

(87) PCT Pub. No.: WO2008/031243
PCT Pub. Date: Mar. 20, 2008

(65) Prior Publication Data
US 2010/0026935 A1 Feb. 4, 2010

(30) Foreign Application Priority Data

Sep. 13, 2006 (EP) ..................... 06120610

(51) Int. Cl.
*G02F 1/1347* (2006.01)
(52) U.S. Cl. .......................................... 349/75
(58) Field of Classification Search .................. None
See application file for complete search history.

(56) References Cited

U.S. PATENT DOCUMENTS

| | | | |
|---|---|---|---|
| 4,122,027 A | 10/1978 | Cole, Jr. et al. | |
| 4,401,369 A | 8/1983 | Jones | |
| 4,565,424 A | 1/1986 | Huffman et al. | |
| 4,667,020 A | 5/1987 | Etzbach et al. | |
| 4,974,941 A | 12/1990 | Gibbons et al. | |
| 5,389,285 A | 2/1995 | Shannon et al. | |
| 5,389,689 A | 2/1995 | Fujimoto et al. | |
| 5,539,074 A | 7/1996 | Herr et al. | |
| 5,602,661 A | 2/1997 | Schadt et al. | |
| 5,650,534 A | 7/1997 | Kelly et al. | |
| 5,700,393 A | 12/1997 | Kelly | |
| 5,851,424 A | 12/1998 | Kelly | |
| 6,107,427 A | 8/2000 | Herr et al. | |
| 6,201,087 B1 | 3/2001 | Herr et al. | |
| 6,335,409 B1 | 1/2002 | Herr et al. | |
| 6,395,351 B1 | 5/2002 | Benecke et al. | |
| 6,632,909 B2 | 10/2003 | Buchecker et al. | |
| 6,733,690 B1 | 5/2004 | Lukac et al. | |
| 6,746,729 B1 | 6/2004 | Cherkaoui et al. | |
| 2004/0164272 A1 | 8/2004 | Buchecker et al. | |

FOREIGN PATENT DOCUMENTS

| | | |
|---|---|---|
| EP | 0 689 084 A1 | 12/1995 |
| EP | 0 756 193 A1 | 1/1997 |
| EP | 0 770 889 A2 | 5/1997 |
| EP | 1 090 325 B1 | 4/2001 |
| WO | 99/37735 A1 | 7/1999 |
| WO | 99/64924 A1 | 12/1999 |
| WO | 00/04110 A1 | 1/2000 |
| WO | 00/05189 A1 | 2/2000 |
| WO | 00/07975 A1 | 2/2000 |
| WO | 00/48985 A1 | 8/2000 |
| WO | 03/027056 A1 | 4/2003 |
| WO | 2004/085547 A1 | 10/2004 |
| WO | 2005/054406 A1 | 6/2005 |
| WO | WO 2005085941 A1 * | 9/2005 |
| WO | 2005/105932 A1 | 11/2005 |

OTHER PUBLICATIONS

Shannon P J, et al., "Patterned Optical Properties in Photopolymerized Surface-Aligned Liquid-Crystal Films" Nature, Nature Publishing Group, London, Apr. 1994, pp. 532-533, vol. 368, XP000198481 ISSN: 0028-0836.

* cited by examiner

Primary Examiner — Sung Pak
(74) Attorney, Agent, or Firm — Sughrue Mion, PLLC

(57) ABSTRACT

This invention relates to a birefringent layer, wherein the direction of the optical axis varies along the thickness direction of the layer, comprising I)
(i) a liquid crystal monomer or pre-polymer having polymerisable groups; and
(ii) a monomer or oligomer or polymer having photo-orientable groups, and/or
(iii) a liquid crystal monomer or pre-polymer, oligomer or polymer having photo-orientable and polymerisable groups, and
(iv) and optionally further components,
or II)
(v) a liquid crystal monomer or pre-polymer, oligomer or polymer having photo-orientable and polymerisable groups, and
(vi) and optionally further components, in addition, this invention relates to a method for the preparation of the birefringent layer, its uses and optical components thereof.

32 Claims, No Drawings

VOLUME PHOTO-ALIGNED RETARDER

CROSS REFERENCE TO RELATED APPLICATION

This application is a National Stage of International Application No. PCT/CH2007/000441 filed Sep. 7, 2007, claiming priority based on European Patent Application No. 06120610.8, filed Sep. 13, 2006, the contents of all of which are incorporated herein by reference in their entirety.

This invention relates to a birefringent layer, wherein the direction of the optical axis varies along the thickness direction of the layer, comprising I)
- (i) a liquid crystal monomer or pre-polymer having polymerisable groups; and
- (ii) a monomer or oligomer or polymer having photo-orientable groups, and/or
- (iii) a liquid crystal monomer or pre-polymer, oligomer or polymer having photo-orientable and polymerisable groups, and
- (iv) and optionally further components;

or

II)
- (v) a liquid crystal monomer or pre-polymer, oligomer or polymer having photo-orientable and polymerisable groups, and
- (vi) and optionally further components, in addition, this invention relates to a method for the preparation of the birefringent layer, its uses and optical components thereof.

Birefringent layers are broadly used to modify the polarization state of light. For a long time, optical retarders, such as quarter and half wave retarders were dominant applications for birefringent layers, for example to rotate the plane of linearly polarized light by 90° or to convert linearly polarized light into circularly polarized light or vice versa.

Starting a couple of years ago, high quality liquid crystal displays (LCD) used in computer monitors, TV sets or mobile phones employ huge amounts of birefringent foils with a variety of optical properties. Depending on the specific application, birefringent films in LCDs have to improve contrast, brightness, viewing angle or color saturation.

Today, most of the birefringent foils used in LCDs are still stretched plastic films. However, stretching of films can not achieve all of the complex optical properties which are required for further improvement of the optical properties of LCDs, since stretching only allows to modify the refractive index along and perpendicular to the web direction. During the last years coated retarders with additional optical properties have become a well known alternative to stretched retarders.

Coated retarders are typically based on cross-linkable liquid crystal materials. Such materials are coated as monomers on substrates with surfaces modified to exhibit alignment capabilities. After coating and drying the liquid crystals are aligned according to the alignment information and afterwards cross-linked by exposure to ultraviolet (uv) light. The cross-linked liquid crystals are referred to as liquid crystal polymers (LCP) in the following text.

The most advanced techniques to generate alignment on a substrate are brushing and photo-alignment. Brushing technique is well established in LCD manufacturing, but has some drawbacks, such as the generation of dust, which requires subsequent cleaning steps. Another drawback is the limited range of adjustable alignment direction angles in roll to roll manufacturing, which for certain applications requires that individual sheets have to be cut, aligned and laminated to the polarizer, rather than directly laminating both films roll by roll.

U.S. Pat. No. 4,974,941 (Gibbons et al.) describes a process wherein a preferred direction is induced in response to exposure with linearly polarized light of an appropriate wavelength by the cis-trans-isomerisation of dyes. Liquid crystals in contact with a surface thus exposed are oriented in accordance with this preferred direction. This orientation process is reversible—i.e., by further exposure of the layer to light of a second polarisation direction the orientation direction can be rotated again.

In the case of the photostructurable orientation layers described in U.S. Pat. No. 5,389,689 (Chigrinov et al.), an irreversible anisotropic polymer network is generated during exposure to linearly polarized light, which exhibits aligning properties for liquid crystals. Such linear photo-polymerised polymer networks (LPP) are of use wherever stable, structured or unstructured liquid crystal orientation layers are required.

Layer structures comprising an anisotropic film of LCPs in contact with an LPP aligning layer are described in U.S. Pat. No. 5,602,661 (Schadt et al.). With this technique, it is even possible to manufacture multi-layer structures consisting of several oriented LCP layers, as is shown e.g. in European Patent No. 689 084 (Schadt et al.).

As is well known, in addition to an azimuthal alignment, a tilt angle, i.e. an inclination of the optical axis of the liquid crystal layer relative to the plane of the layer, is often necessary. This can be achieved by an LPP orientation layer having a tilt angle on the surface, disclosed e.g. in European Application No. 0 756 193 (Schadt et al.).

A simplification of the above described LCP layer aligned by a photo-alignment layer is disclosed in European Patent EP 1,090,325. The patent describes a material, which is liquid crystalline and exhibits photo-alignment function at the same time. Typically such material is a mixture of a photo-aligning material with cross-linkable liquid crystals. Such material can be coated to a substrate which is not required to exhibit alignment capabilities. A layer of such a material is then exposed to linearly polarized uv-light which induces alignment of the cross-linkable liquid crystals which are part of the material. After the alignment process is finished, the liquid crystal orientation is fixed by uv-crosslinking. By oblique exposure to linearly polarized uv-light the optical axis of the birefringent layer can be tilted. As a difference to the LCP layers aligned by aligning surfaces, as described above, the alignment of the molecules in the combined material is not only controlled by the surfaces but also from inside the bulk of the material. Such material will be referred to as volume photo-alignable retarder (VPR) material in the following text. Obviously, the advantage of such a material is a reduced number of layers and processing steps, which may reduce cost and increase yield in production.

Since photo electronics, such as consumer optical communications, LCDs belongs to a fast developing market, there is a constant demand for improving quality and functionalities and reducing costs.

The present invention provides additional functionality to above described layers.

Accordingly, the present invention relates to a birefringent layer, wherein the direction of the optical axis varies along the thickness direction of the layer, comprising I)
- (i) a liquid crystal monomer or pre-polymer having polymerisable groups; and (ii) a monomer or oligomer or polymer having photo-orientable groups, and preferably in addition having polymerisable groups, and/or (iii) a liquid crystal monomer or pre-polymer, oligomer or polymer, having photo-orientable groups and polymerisable groups (iv) and optionally further components, or

II)

(v) a liquid crystal monomer or pre-polymer, oligomer or polymer, having photo-orientable groups and polymerisable groups (vi) and optionally further components.

In the context of the present invention polymerisable groups encompass cross-linked groups.

In the context of the present invention the expression "photo-orientable groups" has the meaning of groups, which are capable of developing a preferred direction, if irradiated with aligning light and thus inducing an alignment of liquid crystals.

In the context of the present invention, aligning light is light of wavelengths, which can initiate photo-alignment. Preferably, the wavelengths are in the UV-A, UVB and/or UV/C-range, or in the visible range. It depends on the photo-alignment compound, which wavelengths are appropriate.

More preferably, aligning light is at least partially linearly polarized, elliptically polarized, such as for example circularly polarized, or non-polarized, most preferably circularly polarized, or non-polarized light exposed obliquely, or at least partially linearly polarized light.

Photo-orientable groups are more preferably anisotropically absorbing molecules. The anisotropically absorbing molecules exhibit absorption properties with different values, typically in the range of about from 150 to 2000 nm.

The anisotropically absorbing molecules typically used have carbon-carbon, carbon-nitrogen, or nitrogen-nitrogen double bonds.

The anisotropically absorbing molecules are for example azo dyes, anthraquinone, mericyanine, methane, 2-phenylazothiazole, 2-phenylazobenzthiazole, stilbene, 1,4-bis(2-phenylethylenyl)benzene, 4,4'-bis(arylazo)stilbenes, perylene, 4,8-diamino-1,5-naphthoquinone dyes, diaryl ketones, having a ketone moiety or ketone derivative in conjugation with two aromatic rings, such as for example substituted benzophenones, benzophenone imines, phenylhydrazones, and semicarbazones or cinnamates. Preparation of the anisotropically absorbing materials listed above are well known as shown, e.g. by Hoffman et al., U.S. Pat. No. 4,565,424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferred anisotropically absorbing molecules are arylazo, poly(arylazo), stilbene and diaryl ketone derivatives and cinnamates.

More preferred are arylazo, stilbene, diaryl ketone and cinnamate.

The anisotropically absorbing molecules can be covalently bonded within a main chain polymer, they can be covalently bonded as side chain groups to a main chain or they can be present as non bonded solutes in a polymer.

Polymers denotes for example to polyacrylate, polymethacrylate, polyimide, polyamic acids, polymaleinimide, poly-2-chloroacrylate, poly-2-phenylacrylate; unsubstituted or with $C_1$-$C_6$ alkyl substituted poylacrylamide, polymethacyrlamide, poly-2-chloroacrylamide, poly-2-phenylacrylamide, polyvinylether, polyvinylester, polystyrene-derivatives, polysiloxane, straight-chain or branched alkyl esters of polyacrylic or polymethacrylic acids; polyphenoxyalkylacrylates, polyphenoxyalkylmethacrylates, polyphenylalkylmathacrylates, with alkyl residues of 1-20 carbon atoms; polyacrylnitril, polymethacrylnitril, polystyrene, poly-4-methylstyrene or mixtures thereof.

Further, preferred photo-orientable monomer or oligomer or polymer is described in U.S. Pat. No. 5,539,074, U.S. Pat. No. 6,201,087, U.S. Pat. No. 6,107,427, U.S. Pat. No. 6,335,409 and U.S. Pat. No. 6,632,909.

A liquid crystal monomer or pre-polymer denotes materials or compounds comprising one or more rod-shaped, board-shaped or disk-shaped mesogenic groups, i.e. groups with the ability to induce liquid crystal phase behaviour. Liquid crystal compounds with rod-shaped or board-shaped groups are also known in the art as calamitic liquid crystals. Liquid crystal compounds with a disk-shaped group are also known in the art as discotic liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

A liquid crystal monomer or pre-polymer having cross-linkable groups that can be used in the present invention are for example disclosed in WO 2005/105932, WO 2005/054406, WO 2004/085547, WO 2003/027056, U.S. Patent No. 2004/0164272, U.S. Pat. No. 6,746,729, U.S. Pat. No. 6,733,690, WO 2000/48985, WO 2000/07975, WO 2000/04110, WO, 2000/05189, WO 99/37735, U.S. Pat. No. 6,395,351, U.S. Pat. No. 5,700,393, U.S. Pat. No. 5,851,424 and U.S. Pat. No. 5,650,534.

Preferred cross-linkable groups denote for example acrylate or diacrylate, methacrylate, dimethacrylate, allyl, vinyl or acrylamide.

More preferred is a liquid crystal monomer or pre-polymer having acrylate or diacrylate cross-linkable groups.

In the context of the present invention the expression "further components" has the meaning of for example, chiral molecules, dichroic molecules and optical absorbers.

Assuming that the liquid crystal monomer or pre-polymer having polymerisable groups (i) is present in an amount of 100 parts by weight, the monomer or oligomer or polymer having photo-orientable groups (ii), and/or the liquid crystal monomer or pre-polymer having polymerisable and photo-orientable groups (iii) is usually present in an amount of at least 0.1 part by weight, more preferably of at least 1 part by weight, most preferably of at least 10 parts by weight.

A preferred embodiment of the invention relates to a birefringent layer comprising

I)

(i) a mixture of liquid crystal monomer or pre-polymer or oligomer or polymer, having polymerisable groups; and (ii) a monomer or oligomer or polymer having photo-orientable groups, and preferably having polymerisable groups a mixture of a monomer or oligomer or polymer having photo-orientable groups, and preferably having polymerisable groups and/or (iii) a liquid crystal monomer or pre-polymer, or oligomer or polymer having photo-orientable groups and polymerisable groups or a mixture of a liquid crystal monomer or pre-polymer having photo-orientable groups and polymerisable groups, and (iv) optionally further components;

wherein the amounts of the substances in the mixture are identical or different, or

II)

(v) a liquid crystal monomer or pre-polymer, or oligomer or polymer having photo-orientable groups and polymerisable groups, or a mixture of a liquid crystal monomer or pre-polymer having photo-orientable groups and polymerisable groups, and (vi) optionally further components; wherein the amounts of the substances in the mixture are identical or different.

In a further preferred embodiment of the invention, the substances (i) and (iii) have a nematic phase or a cholesteric phase or a smetic phase. It depends on the intended application, which phase is selected.

Another preferred embodiment of the invention relates to a birefringent layer comprising a non-linear profile.

A further preferred embodiment of the invention relates to a birefringent layer, wherein the substances (i) and/or (iii) are aligned on a substrate exhibiting an aligning surface.

Another embodiment of the invention relates to a birefringent layer, wherein the substances (i) and/or (iii) are aligned, whereby alignment is induced by a substrate exhibiting an aligning surface, and by volume photo-alignment, preferably both alignment information, from the aligning surface and by volume photo-alignment, preferably the azimuthally and/or obliquely induced alignment, are different.

In addition, a preferred embodiment of the invention relates to a birefringent layer, wherein the substances (i) and/or (iii) are aligned on a substrate exhibiting an aligning surface and wherein the birefringent layer comprises a non-linear tilt-profile.

Further, a preferred embodiment of the invention relates to a birefringent layer, which is linearly or non-linearly twisted.

In addition, a preferred embodiment of the invention relates to a birefringent layer, which has bend deformation or splay deformation.

In an addition an embodiment of the invention, the birefringent layer further comprises chiral molecules.

In another preferred embodiment, the birefringent layer further comprises dichroic molecules.

A further preferred embodiment relates to birefringent layer comprising substances (i), (ii) and/or (iii) distributed in the range from a homogeneously distribution to a phase separation, preferably wherein the substances (i) and (ii) and/or (iii) are phase separated.

Depending on the interaction of the photo-orientable and the liquid crystal substances, the mixture may be homogeneous as one extreme or the aligning compounds and the liquid crystals may be totally separated in layers as another extreme. One preferred situation is a total phase separation in layers, where a layer of photo-alignable compounds is located at one or both surfaces of the birefringent layer. The latter case offers a self organizing material, where coating of a single layer provides a layer structure which is similar to that of a liquid crystal cell, where alignment layers on both sides of a liquid crystal layer provide alignment information.

A more preferred embodiment relates to a birefringent layer comprising substances (i) and (ii) and/or (iii) phase separated, wherein substance (i) forms a layer above substance (ii); or wherein substance (ii) forms a layer above substance (iii); or wherein substance (i) forms a layer below substance (ii); or wherein substance (ii) forms a layer below substance (iii); or wherein substance (ii) forms two layers, one above substance (i) and one below substance (i); or wherein substance (ii) forms two layers, one above substance (iii) and one below substance (iii); or wherein substance (iii) forms a layer above and/or below substance (i).

In addition, the present invention relates to a birefringent layer, wherein at least a single substance of the birefringent layer, in particular of the photo-orientable and/or the photo-oriented substances (ii), and/or the liquid crystal substances (i), (iii) and/or the further other components (iv) has a density gradient along the thickness direction of the layer.

The present invention also relates to a method for the preparation of a birefringent layer, wherein the direction of the optical axis varies along the thickness direction of the layer, comprising a) coating a layer of I)
- (i) a liquid crystal monomer or pre-polymer having polymerisable groups; and
- (ii) a monomer or oligomer or polymer having photo-orientable, and preferably in addition having polymerisable groups, and/or
- (iii) a liquid crystal monomer or pre-polymer or oligomer or polymer having photo-orientable groups and polymerisable groups, and
- (iv) optionally a further component;

or

II)
- (v) a liquid crystal monomer or pre-polymer or oligomer or polymer having photo-orientable groups and polymerisable groups, and
- (vi) optionally a further component;

on a substrate and b) exposing the coated layer to aligning light, preferably by a temperature above the clearing point of the liquid crystal substances (i) and/or (iii).

A substrate denotes for a supporting structure. A substrate can be any solid combination of layered materials that provide a useful function for the final layer or liquid crystal display. For example, the substrate can be any combination of the following materials. Crystalline or amorphous silicon, glass, plastic, including polyester and polyimide; quartz, indium-tin-oxide, gold, silver, silicon dioxide, silicon monoxide, anti-reflective coatings, color filter layers, polarizers and phase compensation films. In practices, some of these materials are deposited or coated onto a basic supporting structure such as glass or plastic.

According to the present invention, one method to control the alignment along the thickness direction is to generate a density gradient of at least one substance of the birefringent layer, in particular of the photo-orientable and/or photo-oriented substances (ii), and/or the liquid crystal substances (i), (iii) and/or further components (iv). This can be achieved in several ways, of which some are described in the following, but other methods may work as well.

A preferred embodiment of the invention comprises a method for the preparation of a birefringent layer, wherein the direction of the optical axis varies along the thickness direction of the layer, comprising a) coating a layer of I)
- (i) liquid crystal monomer or pre-polymer having polymerisable groups, or of a mixture of different substances (i), wherein the amount of the substances is identical or different; and
- (ii) a monomer or oligomer or polymer having photo-orientable groups, and preferably having polymerisable groups, or of a mixture of different substances (ii), wherein the amount of the substances is identical or different; and/or
- (iii) a liquid crystal monomer or pre-polymer or oligomer or polymer having polymerisable and photo-orientable groups, or of a mixture of different substances (iii), wherein the amount of the substances is identical or different; and (iv) optionally a further component, or of a mixture of different substances (iv), wherein the amount of the substances is identical or different;
or II)
(v) a liquid crystal monomer or pre-polymer or oligomer or polymer having polymerisable and photo-orientable groups, or of a mixture of different substances (iii), wherein the amount of the substances is identical or different; and
(vi) optionally a further component, or of a mixture of different substances (iv), wherein the amount of the substances is identical or different;
on a substrate, and b) exposing the coated layer to aligning light;
whereby at least one substance of the birefringent layer, in particular of the photo-orientable and/or photo-oriented substances (ii) and/or the liquid crystal substances (i), (iii) and/or further component, generates a density gradient along the thickness direction of the layer.

In a first method to establish a density gradient of at least one substance of the birefringent layer, in particular of the photo-orientable and/or photo-oriented substances and/or the liquid crystal substances and/or absorbers, along the thickness direction of the birefringent layer, the reaction speed is controlled by controlling the light that penetrates into the layer.

This can be achieved by controlling the absorbance of the material in the effective wavelength range of the light. The effective wavelength range is the range in which the alignment of the substances is induced. Since the photo-orientable substance contained in the birefringent layer itself absorbs light in the effective wavelength range the absorbance can for example be controlled by the molecular structure of the photo-aligning compound which influences its extinction coefficient.

A further other way to control the absorbance is to change the concentration profile of substances in the birefringent layer, in particular of the photo-orientable and/or photo-oriented substances, within the birefringent layer.

In addition, a more preferred embodiment of the present invention relates to a method for the preparation of a birefringent layer, wherein the direction of the optical axis varies along the thickness direction of the layer, comprising
a) coating a layer of
I)
(i) a liquid crystal monomer or pre-polymer having polymerisable, preferably crosslinking, groups; and
(ii) a monomer or oligomer or polymer having photo-orientable groups and preferably polymerisable, especially cross-linking groups, and/or
(iii) a liquid crystal monomer or pre-polymer or oligomer or polymer having polymerisable, preferably crosslinking, and photo-orientable groups, and
(iv) optionally a further component,
or
II)
(v) a liquid crystal monomer or pre-polymer or oligomer or polymer having polymerisable, preferably crosslinking, and photo-orientable groups, and
(vi) optionally a further component,
on a substrate, and
b) exposing the coated layer to aligning light, whereby at least some photo-orientable substances (ii) and/or (iii), remain in the layer.

Most preferred is a method, whereby the photo-oriented and photo-orientable substances (ii) and/or (iii) generates a density gradient along the thickness direction of the layer.

As a consequence of absorbing light in the birefringent layer during the photo-alignment process, the reaction rate is highest close to the side where the aligning light enters the layer. Typically the layer is exposed from the opposite side of the substrate, typically from the air side. However, exposure through the substrate is also possible, which offers additional possibilities for complex configurations.

In another more preferred embodiment, the method comprises a) as described above, including all described preferences and b) exposing the coated layer to aligning light from the opposite side of the substrate, usually the air side, or through the substrate.

If the absorption of the birefringent layer changes as a function of the wavelength within the effective range, the wavelengths of the aligning light may be alternatively restricted to a certain range which exhibits the desired absorption.

A further preferred method of the invention relates to a method comprising step a) as described above, including all described preferences and b) exposing the coated layer, wherein the absorption changes as a function of the wavelength within the effective range.

More preferred is the method, wherein in step b) the coated layer is subsequently exposed with different or same wavelength and/or different exposure geometries, such as for example angler of incidence and polarisation direction.

A second method to induce a density gradient of the birefringent layer along the thickness direction is to generate a density gradient of at least one substance within the birefringent layer.

This may be achieved by controlling the mixture behaviour of the birefringent layer, for example by controlling phase separation within the birefringent layer of the birefringent layer.

The density gradient of the photo-orientable substance along the thickness direction can be established prior to the photo-alignment. The density gradient of the photo-orientable substance along the thickness direction may be induced upon exposure to the aligning light.

A further preferred method comprises inducing the density gradient in step a) by coating the layer or after step a), or in step b), or after step b).

The density gradient may be induced by elevated temperatures.

A further more preferred embodiment relates to a method for the preparation of a birefringent layer, wherein the direction of the optical axis varies along the thickness direction of the layer, comprising
a) coating a layer of
I)
(i) a liquid crystal monomer or pre-polymer having polymerisable groups; and
(ii) a monomer or oligomer or polymer having photo-orientable groups, and preferably having polymerisable groups, and/or
(iii) a liquid crystal monomer or pre-polymer or oligomer or polymer having polymerisable and photo-orientable groups,
and
(iv) optionally further components;
or
II)
(v) a liquid crystal monomer or pre-polymer or oligomer or polymer having polymerisable and photo-orientable groups,
and
(vi) optionally further components;
on a substrate,
wherein the substances (i) and (ii) and/or (iii) and/or (iv) are distributed in the range from a homogeneously distribution to a phase separation, preferably wherein the substances (i) and (ii) and/or (iii) and/or (iv) are phase separated, and b) exposing the coated layer to aligning light.

As long as planar alignment of the optical axis is to be achieved, the density gradient of reacted aligning compounds may be less important. However, if the birefringent layer is obliquely exposed in order to tilt the liquid crystal molecules, tilt profiles may be achieved which exhibit a non-linear deformation profile, which can not be achieved with conventional alignment at one or two surfaces, which normally results in a linear variation of the tilt angle along the thickness direction.

Another preferred embodiment of the present invention relates to a method comprising a) as given above, and b) obliquely exposing the coated layer.

The adjustability of the deformation profile is particularly important for the design of further improved viewing angle enhancement films for TN-LCDs (twisted nematic-liquid crystal displays), since the deformation profile influences contrast and color shift at large viewing angles.

Use of the birefringent material, within the above given definition and preferences, having non-linear deformation tilt profile for improving the viewing angle of LCDs, contrast and color shift at large viewing angles.

Further, preferred is a method, wherein the alignment surface induces alignment and wherein alignment is induced in the volume by the aligning light, preferably the aligning information (such as aligning arrangement and tilt angle) of the alignment surface and that induced in the volume are different.

In addition, preferred is a method, wherein the alignment surface and the volume induce a tilt angle, which may be identical or azimuthal different or different both azimuthal and in the tilt angle.

Preferably a substrate exhibiting an alignment surface denotes for example to substrates, which are brushed. Optionally the brushed substrates may be coated before rubbing. In addition, an alignment surface may be accessible by oblique evaporation, ion beam processes or by grating structures. In addition an alignment surface may be a patterned or non-patterned photo-alignment layer. The alignment surface may also be a thin layer of aligned polymerized liquid crystals, whereby the thin layer is on a substrate.

The resulting alignment mechanism from the combination of surface and volume alignment is a combination of the conventional surface alignment and the new volume alignment. The alignment variation along the thickness direction of the birefringent layer is achieved by applying different alignment or tilt directions for the aligning surface and for volume alignment. This offers, for example, a further method to realize strongly non-linear tilt profiles by defining a certain tilt angle in the aligning surface and choosing the exposure parameters such, that a different tilt direction or tilt profile is generated inside the birefringent layer. Depending on the penetration depth of the aligning light the top part of the birefringent layer may for example have a uniaxial tilt, whereas a tilt deformation exists only in the lower part, caused by elastic forces of the liquid crystal material.

According to the present invention, another method to control the alignment along the thickness direction is to coat the birefringent layer on a substrate exhibiting an aligning surface and subsequently perform the photo-alignment and cross-linking process of the birefringent layer as described above.

Another preferred embodiment relates to a method for the preparation of a birefringent layer, wherein the direction of the optical axis varies along the thickness direction of the layer, comprising a) coating of a layer of I)
(i) a liquid crystal monomer or pre-polymer having polymerisable groups; and
(ii) a monomer or oligomer or polymer having photo-orientable groups, and preferably polymerisable groups, and/or
(iii) a liquid crystal monomer or pre-polymer or oligomer or polymer having polymerisable and photo-orientable groups, and
(iv) optionally a further component, or II)
(v) a liquid crystal monomer or pre-polymer or oligomer or polymer having polymerisable and photo-orientable groups, and
(vi) optionally a further component, on a substrate exhibiting an alignment surface, and b) exposing the coated layer to aligning light, wherein alignment is induced in the volume.

A further more preferred method comprising coating on a substrate exhibiting an alignment surface layer, and b) exposing the coated layer from the substrate side or the side opposite to the substrate for aligning the photo-alignable layer.

If the direction of the tilt angles induced by the aligning surface is opposite to that induced by volume photo-alignment, a splayed retarder configuration can be achieved with opposite tilt angles in the lower and in the upper part of the layer. Depending on the magnitude of the tilt angles it may be possible to induce a bend deformation. Both configurations provide higher symmetry of the angular optical properties than the tilted configurations which can be realized with conventionally, surface aligned LCP layers.

The present invention also relates to the use of the birefringent layer according to the invention for a retarder having splayed or bend deformation.

The optical property of the birefringent layer can be significantly changed by setting the azimuthal alignment directions of aligning surface and of the volume alignment to different angles. As a result, a twist deformation will be induced in the birefringent layer, which means that the azimuthal alignment direction of the liquid crystal substances changes along the thickness direction of the birefringent layer. Since volume photo-alignment is effective in the bulk of the birefringent layer, the twist deformation strongly depends on the photo-alignment reaction kinetics along the thickness direction.

A further preferred method relates to a method for the preparation of a birefringent layer, wherein the direction of the optical axis varies along the thickness direction of the layer, comprising a) coating of a layer
(i) a liquid crystal monomer or pre-polymer having polymerisable, preferably crosslinking, groups; and
(ii) a monomer or oligomer or polymer having photo-orientable groups and preferably having polymerisable, preferably crosslinking, groups, and/or
(iii) a liquid crystal monomer or pre-polymer or oligomer or polymer having polymerisable, preferably crosslinking, and photo-orientable groups, and optionally a further component, on a substrate exhibiting an alignment surface, and b) exposing the coated layer to aligning light, preferably with a polarization direction different to the aligning direction of the aligning layer.

Optical component, wherein the layer has a twist deformation.

As described above, the penetration of light can be controlled by the absorption characteristics of photo-orientable substances, the liquid crystal substances or additional absorber additives. For example, the photo-alignment reaction can be restricted to the layer part towards the incoming aligning light, which is normally, but not necessarily, the opposite side of the substrate, usually the air side of the birefringent layer. This case is similar to a configuration, where a liquid crystal is confined between two alignment layers, one of them being the aligning surface, the other being the top part of the birefringent layer, which has been photo-aligned. Such a configuration is well known from liquid crystal cells.

A similar configuration may be achieved by formulations of birefringent layers, in which the liquid crystal and the photo-orientable substances are incompatible with each other, such that the alignment compound phase separates as a layer to the side which is opposite to the substrate, usually the air side, of the birefringent layer. In such a configuration which roughly corresponds to that of a liquid crystal layer confined between two alignment layers, the alignment of the liquid crystals changes linearly along the thickness direction from the alignment direction of the first alignment layer to the direction of the second alignment layer.

Depending on the absorbance of the birefringent layer and exposure energy of the aligning light, the reaction rate in the volume of the birefringent layer will change. If a sufficient amount of aligning light can penetrate to the inside the birefringent layer then its aligning force has to compete with the elastic forces which are responsible for the twist deformation. In general this will lead to a deformation of the linear twist profile along the thickness direction, resulting in a non-linear twist profile. For specific combinations of VPR absorption, layer thickness and exposure energy of the aligning light, volume alignment may be effective in the upper part of the birefringent layer but not in the lower part, which can result in a configuration which can be roughly looked at as a two layer configuration in which the upper part is uniaxially aligned in the direction induced by volume alignment, whereas a twist deformation is induced in the lower part due to the elastic forces. Such configurations may be optimized to exhibit improved achromatic behavior compared to standard uniaxial retarder layers. In the extreme case that the VPR material is volume aligned in full depth, the alignment strength of the separate aligning layer may not be strong enough to induce a twisted configuration any more.

Use of birefringent material for the preparation of an achromatic retarder.

Optical component, wherein the birefringent layer as described above has the function of an achromatic retarder.

From the above description, there are many parameters that can be varied to tailor the configuration of a birefringent layer.

One of the advantages of photo-alignment is the possibility to generate alignment patterns in the layer plane. Volume photo-alignment offers this property as well. Therefore, the above described photo-induced variation of the optical axis along the thickness direction of birefringent layers can also be zone wise different. This can be achieved by multiple exposure using photo-masks. Depending on the configurations to be achieved, the number of exposure steps can be reduced by photo-aligning the VPR material through alignment masters, or through gray scale masks which transmit different doses of light in different areas.

The present invention relates to an optical component comprising a birefringent layer as described above, which is polymerized with locally varying orientation.

For example patterned twisted retarders can be achieved which exhibit different twist angles in different areas. It is even possible to realize neighboring zones which are twisted in opposite directions, whereas the zones exhibiting left and right handed twist may have the same or different absolute value of twist angle.

In addition, the present invention relates to an optical component, wherein the birefringent layer as described above has the function of a twisted retarder.

Without additional definition of the twist sense, the twist angle is limited to 90°. However, the twist sense may be defined by adding chiral dopants and/or by generation of tilt angles in the aligning surface and during volume photo-alignment.

The latter method allows for example to realize patterned twisted retarders with left and right handed areas, which exhibit twist angles of 90° and more.

Further, the present invention relates to an optical component, wherein the birefringent layer as described above has the function of patterned twisted retarders with left and right handed areas.

If the condition for wave guiding is fulfilled, twisted retarders work as achromatic rotators. Patterned achromatic rotators are for example required for 3D LCDs, where the polarization of light has to be rotated for half of the pixels by 90° to encode the polarization state for one of the eyes of the viewer.

A further embodiment of the present invention relates to an optical component, wherein the birefringent layer as described above has the function of an achromatic rotator.

Because the variation of the optical axis direction along the thickness direction influences the effective optical retardation, above methods can be used to tune the optical retardation of birefringent layers by choosing appropriate exposure conditions. Consequently it is also possible to realize a pattern with zone wise different optical retardation. Patterned optical retardation is particularly useful for in-cell retarder applications, since they allow adjusting the retardance specifically to the red, blue and green colors, in order to improve the color stability of LCDs at large viewing angles.

In addition, the present invention relates to an optical component, wherein the birefringent layer as described above has the function of an in-cell retarder.

Further, the present invention relates to an optical component with locally different retarder values.

In addition, the following optical components are encompassed by the present invention:

Optical component comprising a birefringent layer according to the invention, wherein the layer has in the upper part an uniaxial tilt and in the lower part a tilt deformation profile.

Optical component comprising a layer according to the invention having bend or splay deformation.

Optical component comprising a layer according to the invention, wherein a substance (ii) is in the upper part and a substance (i) or (iii) is in the lower part upon an alignment surface.

Optical component comprising a layer according to the invention, wherein a substances (ii) and (i) or (iii) are in the upper part and a substance (i) or (iii) is in the lower part upon an alignment surface.

Optical component comprising a layer according to the invention, comprising substances (i) and (ii) and/or (iii) phase separated, wherein substance (i) forms a layer above substance (ii); or wherein substance (ii) forms a layer above substance (iii); or wherein substance (i) forms a layer under substance (ii); or wherein substance (ii) forms a layer under substance (iii); or wherein substance (ii) forms two layers, one above substance (i) and one under substance (i); or wherein substance (ii) forms two layers, one above substance (iii) and one under substance (iii); or wherein substance (iii) forms a layer above and/or under substance (i).

The methods, uses and optical components have the same definitions and preferences as given above for the birefringent layer.

The present invention gives access to alignment profiles in thickness direction, which are hardly feasible with already known materials and processes.

EXAMPLES

Example 1

The separate alignment layer underneath the volume photo-alignable layer in this case consisted of a photo-alignment layer and an additional thin polymerized liquid crystal layer which was used to enhance the coupling to the photo-alignable retarder layer on top. The commercially available photo-alignment material ROP-103 (ROLIC Technologies, Switzerland) was used for the preparation of the photo-alignment layer. This photo-alignment polymer is based on cinnamate as photo-reactive groups. The polymer backbone of the photo-alignment material is of acrylate type. For the spin-coating of the alignment layer onto the substrate the ROP-103 was dissolved in cyclopentanone at a solid concentration of 2 weight percent. As substrate a machine-washed 1 mm thick, rectangular D263 (Schott, Germany) glass plate was used. The photo-alignment layer solution was applied to the glass substrate and spin-coated for 60 seconds at a spin-speed of 2000 rounds per minute. The consequent dry film thickness achieved this way was approximately 60 nm. Subsequently, the film was thermally treated on a hot-plate for 5 minutes at a temperature of 130° C. After this temper step the photo-alignment layer was exposed to linearly polarized UV light. The intensity of the linearly polarized UV light was 2.2 mW/cm$^2$ in the wavelength range between 280 nm and 340 nm. The exposure dose transferred to the photo-alignment layer was 150 mJ/cm$^2$. The photo-alignment layer was in this case exposed to vertically incident light. The polarization axis was chosen parallel to one substrate edge ($\phi$=0°). Subsequently, a thin polymerizable liquid crystal layer was applied with the objective to align according to the preset subjacent photo-alignment layer. The material used for the thin liquid crystalline alignment enhancement film was the commercially available polymerizable liquid crystal monomer material ROF-5102 (ROLIC Technologies, Switzerland). The ROF-5102 formulation comprises di-acrylate type liquid crystal monomers. The ROF-5102 was dissolved in methyl propyl ketone with a solid concentration of 2 weight percent. The solution was applied onto the ROP-103 photo-alignment layer and then spin-coated for 2 minutes with a spin-speed of 2000 rounds per minute. A dry film thickness of approximately 30 nm was achieved this way. After spin-coating the film was thermally treated on a hot-plate for 5 minutes at a temperature of 54° C. Finally, the liquid crystalline monomer film was crosslinked in nitrogen atmosphere by exposure to UVA light with an intensity of 3 mW/cm$^2$ (wavelength range of 320 to 400 nm). An exposure dose of 2 J/cm$^2$ was transferred to the sample.

After completion of the above described preparation of the separate alignment layer the processing continued with the application of the photo-alignable retarder film. The photo-alignable retarder material consisted of a mixture of the above mentioned alignment polymer ROP-103 and the polymerizable liquid crystal monomer material ROF-5102. A ROP-103/ROF-5102 ratio of 3 to 7 was selected for this specific photo-alignable retarder mixture. The mixture was dissolved in anisole with a solid concentration of 30 weight percent. The solution of the photo-alignable retarder material was applied onto the previously prepared alignment layer on the D263 glass plate and subsequently spin-coated for 120 seconds at a spin-speed of 2000 rounds per minute. This resulted in a final dry film thickness of the photo-alignable retarder layer of 1 micron. A two-step thermal treatment was then applied by means of a hot-plate. In the first step the sample was heated to 50° C. for a duration of 2 minutes. In the second step the temperature was increased to 130° C. The sample was held at this temperature for 3 minutes. For the subsequent photo-alignment process the sample was cooled down to a temperature of 59° C., which is 3° C. above the clearing point of the photo-alignable retarder material. The exposure intensity used for the photo-alignable retarder was 2.2 mW/cm$^2$ in the wavelength range between 280 nm and 340 nm. The exposure dose transferred to the photo-alignable retarder layer was 100 mJ/cm$^2$. The sample was exposed to vertically incident linearly polarized light with the polarization axis diagonal to the substrate edges ($\phi$=45°). Thus, the alignment directions induced to the separate, subjacent photo-alignment layer and the photo-alignable retarder on top deviated by 45°. After the photo-alignment step of the photo-alignable retarder layer the temperature of the sample was decreased from 59° C. down to 40° C. with a cooling rate of 1° C. per minute and after that quickly down to room-temperature. In the final step, the sample was placed in a nitrogen atmosphere and exposed to unpolarized UVA light with the goal to initiate the cross-linking of the LCP monomers and thus transfer the film into a solid state. The UVA light source provided an intensity of 3 mW/cm$^2$ (wavelength range of 320 to 400 nm). A dose of 700 mJ/cm$^2$ was transferred to the sample during the UVA exposure.

Examination of the retarder sample between crossed polarizers on a light table showed that the alignment quality of the retarder was very good. The birefringent behaviour, however, was found not to be consistent with the behaviour of a standard retarder with homogeneous azimuthal orientation of the optical axis along the thickness direction (bright state in case of retarder optical axis diagonal to polarizer transmission axes and dark state in case of retarder optical axis parallel/perpendicular to polarizer transmission axes). From this result it could be concluded that the combined effect of the alignment transferred from the subjacent alignment layer to the photo-alignable retarder film and the alignment directly applied to the photo-alignable retarder film leads to a twist profile of the optical axis along the thickness direction within the retarder layer, i.e. the azimuthal orientation of the director varies along the thickness direction. The retarder film was additionally characterized by means of ellipsometry which confirmed that a twist profile exists in the sample. It was found that the optical axis within the retarder film twists from the direction defined by the subjacent photo-alignment layer surface ($\phi$=0°) to the direction defined by the photo-alignment of the photo-alignable retarder film ($\phi$=45°).

The invention claimed is:

1. A method for the preparation of a birefringent layer, wherein the direction of the optical axis varies along the thickness direction of the layer, comprising
   a) coating a layer comprising
      (i) a liquid crystal monomer or pre-polymer having polymerisable groups; and
      (ii) a monomer or oligomer or polymer having photo-orientable groups on a substrate exhibiting an aligning surface
   b) exposing the coated layer to aligning light such that the aligning information of the alignment surface and that induced by the volume-photo-alignment are different, wherein the variation of the optical axis along the thickness direction is induced by the exposure of the coated layer to the aligning light.

2. The method according to claim 1, wherein compounds (i) and (ii) are phase separated.

3. The method according to claim 2, wherein compounds (i) and (ii) are phase separated in layers.

4. The method according to claim 1, wherein a density gradient of the photo-orientable substance along the thickness direction is induced upon exposure to the aligning light.

5. The method according to claim 1, wherein compound (ii) is liquid crystalline and polymerisable.

6. The method according to claim 5, in which compounds (i) and (ii) are identical.

7. The method according to claim 1, wherein the coated substrate is zonewise differently exposed to the aligning light, thereby generating a pattern in which the photo-induced variation of the optical axis along the thickness direction of the birefringent layer is zonewise different.

8. The method according to claim 1, wherein the azimuthal alignment directions of the alignment surface and of the volume-photo-alignment are different, such that a twist deformation is induced in the layer.

9. The method according to claim 8, wherein the twist deformation profile is non-linear.

10. The method according to claim 7, wherein the exposure is such that a patterned twisted retarder results, which exhibits different twist angles in different areas.

11. The method according to claim 10, wherein the exposure is such that a patterned twisted retarder results, which exhibits neighboring zones which are twisted in opposite directions.

12. The method according to claim 1, wherein the coated layer is exposed to obliquely incident light.

13. The method according to claim 12, wherein the exposure is such that the tilt angle induced by volume-photo-alignment is opposite to that induced by the aligning surface.

14. The method according to claim 1, wherein in a subsequent step the alignment in the coated layer is fixed by cross-linking.

15. An optical component comprising a birefringent layer produced according to the method of claim 1.

16. An optical component comprising a birefringent layer produced according to the method of claim 2.

17. An optical component comprising a birefringent layer produced according to the method of claim 3.

18. An optical component comprising a birefringent layer produced according to the method of claim 4.

19. An optical component comprising a birefringent layer produced according to the method of claim 5.

20. An optical component comprising a birefringent layer produced according to the method of claim 6.

21. An optical component comprising a birefringent layer produced according to the method of claim 7.

22. An optical component comprising a birefringent layer produced according to the method of claim 8.

23. An optical component comprising a birefringent layer produced according to the method of claim 9.

24. An optical component comprising a birefringent layer produced according to the method of claim 10.

25. An optical component comprising a birefringent layer produced according to the method of claim 11.

26. An optical component comprising a birefringent layer produced according to the method of claim 12.

27. An optical component comprising a birefringent layer produced according to the method of claim 13.

28. An optical component comprising a birefringent layer produced according to the method of claim 14.

29. A patterned twisted retarder produced according to the method of claim 10.

30. A patterned twisted retarder comprising left and right handed areas, produced according to the method of claim 11.

31. The patterned twisted retarder according to claim 30, wherein the twisted retarder has the function of an achromatic rotator.

32. A 3D-LCD comprising a patterned twisted retarder according to claim 31.

* * * * *